United States Patent
Saarikko et al.

(10) Patent No.: US 8,155,489 B2
(45) Date of Patent: Apr. 10, 2012

(54) METHOD FOR COUPLING LIGHT INTO A THIN PLANAR WAVEGUIDE

(75) Inventors: Pasi Risto Olavi Saarikko, Espoo (FI); Tapani Kalervo Levola, Tampere (FI); Pauli Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/513,255

(22) PCT Filed: Nov. 2, 2006

(86) PCT No.: PCT/FI2006/050476
§ 371 (c)(1),
(2), (4) Date: May 12, 2010

(87) PCT Pub. No.: WO2008/053063
PCT Pub. Date: May 8, 2008

(65) Prior Publication Data
US 2010/0220956 A1    Sep. 2, 2010

(51) Int. Cl.
*G02B 6/30*        (2006.01)

(52) U.S. Cl. ............... 385/49; 385/31; 385/50; 362/628
(58) Field of Classification Search .............. 362/628
See application file for complete search history.

(56) References Cited

U.S. PATENT DOCUMENTS
5,772,304 A * 6/1998 Smith ....................... 362/511
* cited by examiner

*Primary Examiner* — Jerry Rahll
(74) *Attorney, Agent, or Firm* — Harrinton & Smith

(57) ABSTRACT

A light distributing device (100) comprises a thin planar waveguide (10) and a waveguiding ridge (20). An incoming light beam (B1) coupled into the ridge (20) forms a second light beam (B2) waveguided in the ridge (20). The ridge (20) and the planar waveguide (10) have a common portion (23) such that light is further coupled from the side of the ridge (20) into the planar waveguide (10) through said common portion (23). Thus, optical power of a broad incoming beam (B1) may be effectively coupled to a relatively thin planar waveguide (10). The planar waveguide (10) may further comprise diffractive out-coupling elements (30) to direct light towards a display (400).

20 Claims, 15 Drawing Sheets

METHOD FOR COUPLING LIGHT INTO A THIN PLANAR WAVEGUIDE

RELATED APPLICATION

This application was originally filed as and claims priority to PCT Application No. PCT/FI2006/050476 which was filed on Nov. 2, 2006.

FIELD OF THE INVENTION

The present invention relates to coupling light into planar waveguides.

BACKGROUND OF THE INVENTION

Planar waveguides are cost-effective devices to provide lighting for e.g. liquid crystal displays or keysets. Light which is initially provided e.g. by an external light emitting diode (LED) may be distributed to a larger area by means of a planar waveguide. The use of thin planar waveguides may facilitate reducing size, weight and manufacturing costs of a portable device.

Referring to FIG. 1, optical power may be lost when a broad light beam B1 emitted by a light source 200 impinges on the edge of a thin planar waveguide 10, as the beam B1 overlaps only partially with the edge.

Referring to FIG. 2, optical power may be also lost when the light source is misaligned with respect to the edge of a thin planar waveguide 10. The coupling efficiency may be degraded due to misalignment also in a case when the vertical dimension of the light beam is equal to or smaller than the thickness of the planar waveguide. As the thickness of the planar waveguide may be e.g. 0.2 mm, and the manufacturing tolerances may be e.g. 0.5 mm, the alignment problem may be significant in mass production.

The arrangements of FIGS. 1 and 2 are herein called "directly edge coupled" arrangements.

FIG. 3 of a patent publication US2005/0259939 discloses a further directly edge coupled arrangement wherein a planar waveguide has a tapered edge portion to facilitate coupling of light into the planar waveguide.

SUMMARY OF THE INVENTION

The object of the invention is to provide a device and a method for coupling light emitted by a light source into a planar waveguide. A further object of the invention is to provide lighting for a display. A further object of the invention is also to provide lighting for a keyset.

According to a first aspect of the invention, there is provided a device comprising:
 a ridge, and
 a substantially planar waveguide comprising at least one out-coupling portion, wherein said ridge has an end for coupling light into said ridge in order to form a light beam waveguided longitudinally within said ridge, said ridge and said planar waveguide having a common portion to couple light out of said ridge sideways into said planar waveguide, and said out-coupling portion being adapted to couple light out of the plane of said planar waveguide.

According to a second aspect of the invention, there is provided a method of distributing light by using a ridge and a substantially planar waveguide, said method comprising:
 coupling light into said ridge to form a light beam waveguided longitudinally in said ridge, and
 coupling light out of said ridge sideways into said planar waveguide through a common portion of said ridge and said planar waveguide.

The light distributing device comprises a substantially planar waveguide and a waveguiding ridge. A light beam emitted by a light source is coupled into the end of the ridge to form a second light beam which is waveguided longitudinally in the ridge. The side of the ridge overlaps with the planar waveguide such that the ridge and the planar waveguide have a common portion. Light is coupled sideways from the ridge into the planar waveguide through said common portion. In other words, the light confined in the waveguiding ridge leaks in a transverse manner through the overlapping portion to the planar waveguide.

The height of the ridge is greater than the thickness of the planar waveguide.

In an embodiment, a good efficiency of coupling the optical power of a light beam into a thin planar waveguide may be attained, although the thickness of the planar waveguide may be substantially smaller than the vertical dimension of the in-coupled light beam. The coupling efficiency may be improved especially when compared with the directly edge coupled arrangement of FIG. 1.

In an embodiment, the ridge of the light distributing device facilitates alignment of the light source when the vertical dimension of the in-coupled light beam is smaller than the height of the ridge. Thus, sensitivity to manufacturing tolerances may be reduced especially when compared with the directly edge coupled arrangement of FIG. 2.

In an embodiment, the ridge of the light distributing device may facilitate providing a more uniform distribution of optical intensity inside the planar waveguide than what can be attained by the directly edge-coupled arrangements, when using the same number of light sources.

In an embodiment, a relatively uniform distribution of light may be provided by using only one light source.

In an embodiment, the improvement in the coupling efficiency, tolerance to misalignment, and a more uniform distribution of intensity in the planar waveguide may be attained simultaneously.

In an embodiment, a thin keypad and/or a thin display may be implemented.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings in which.

DETAILED DESCRIPTION

Figure 1:
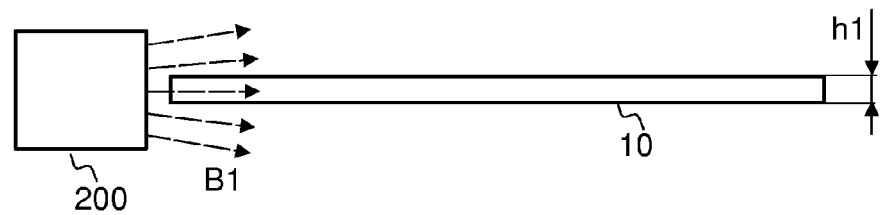
FIG. 1 shows a side view of prior art coupling of a broad light beam into a planar waveguide.
Figure 2:
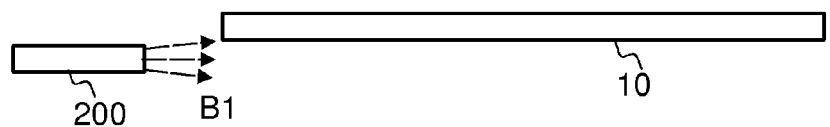
FIG. 2 shows a side view of misalignment of a light source with respect to a planar waveguide.
Figure 3:
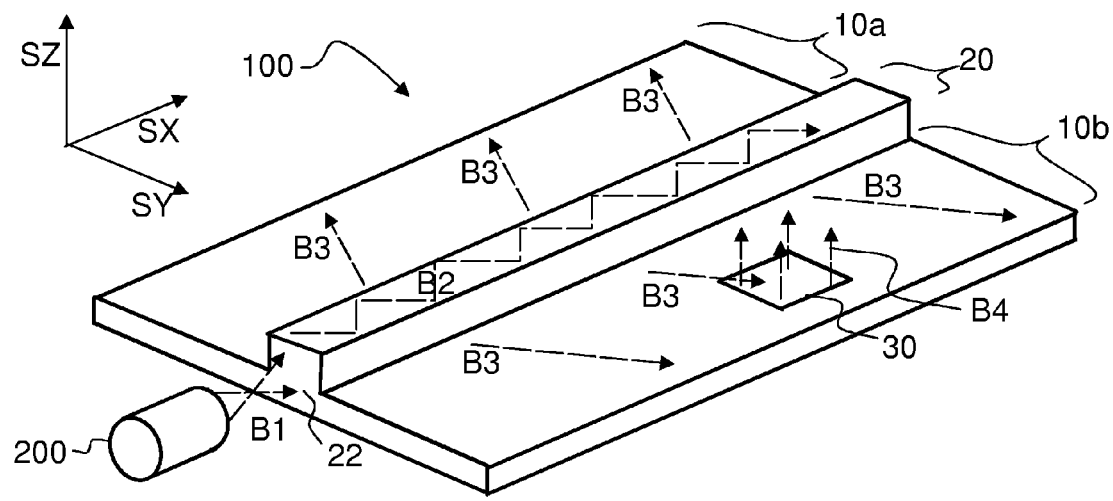
FIG. 3 is a three-dimensional view of a light distributing device comprising a planar waveguide and a ridge for coupling light into said planar waveguide.

FIG. 3 shows a light distributing device 100 comprising planar waveguides 10a, 10b, and a ridge 20 to couple light into the planar waveguides 10a, 10b. A light beam B1 provided by a light source 200 is coupled into an end 22 of the ridge 20 in order to form a light beam B2 which propagates in the longitudinal direction SX of ridge 20.

The lower sides of the ridge 20 are optically coupled to the planar waveguides 10a, 10b. Thus, a fraction of the light B2 propagating in the ridge 20 is transversely coupled from the sides of the ridge 20 into the planar waveguides 10a, 10b, in order to form light B3 which propagates in the planar waveguides 10a, 10b.

The light is confined to the ridge 20 and to the planar waveguides 10a, 10b by total internal reflections, i.e. the light is waveguided in the ridge 20 and the planar waveguides 10a, 10b.

The light distributing device 100 may further comprise one or more out-coupling portions 30 to couple light out of the plane of the planar waveguides 10a, 10b in order to form an out-coupled light beam B4. The out-coupling portion 30 may be e.g. a diffraction grating. The out-coupled light beam B4 may be viewed e.g. by a human viewer (not shown).

The incoming beam B1 may be provided by a light source which may be e.g. a light emitting diode (LED), a resonant cavity LED, or a laser. The light source 200 may be in contact with the end 22 of the ridge or at some distance from it.

The horizontal direction SY is perpendicular to the longitudinal direction SX of ridge 20, and the vertical direction SZ is perpendicular to the directions SX and SY.

Figure 4:
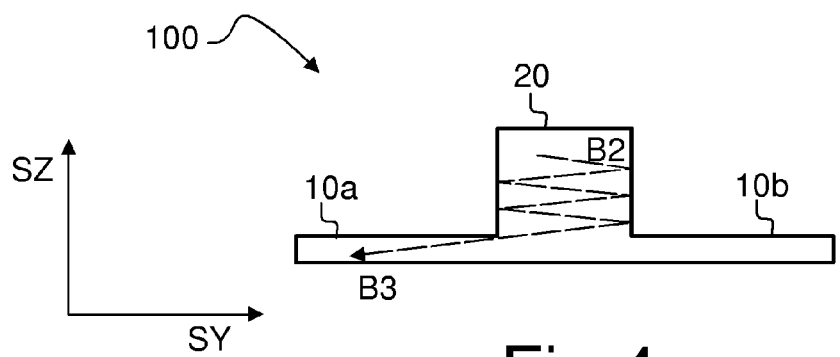
FIG. 4 shows an end view of a device according to FIG. 3.

FIG. 4 shows an end view of the light distributing device 100 according to FIG. 3. In-coupled light rays which fulfill the criterion for total internal reflection may be reflected once or many times on the walls of the ridge 20, and contribute to the light beam B2 propagating in the ridge 20. When the light rays of the beam B2 impinge on the lower side of the ridge, they may be coupled into the planar waveguides 10a, 10b, subsequently forming light beams B3.

Figure 5:
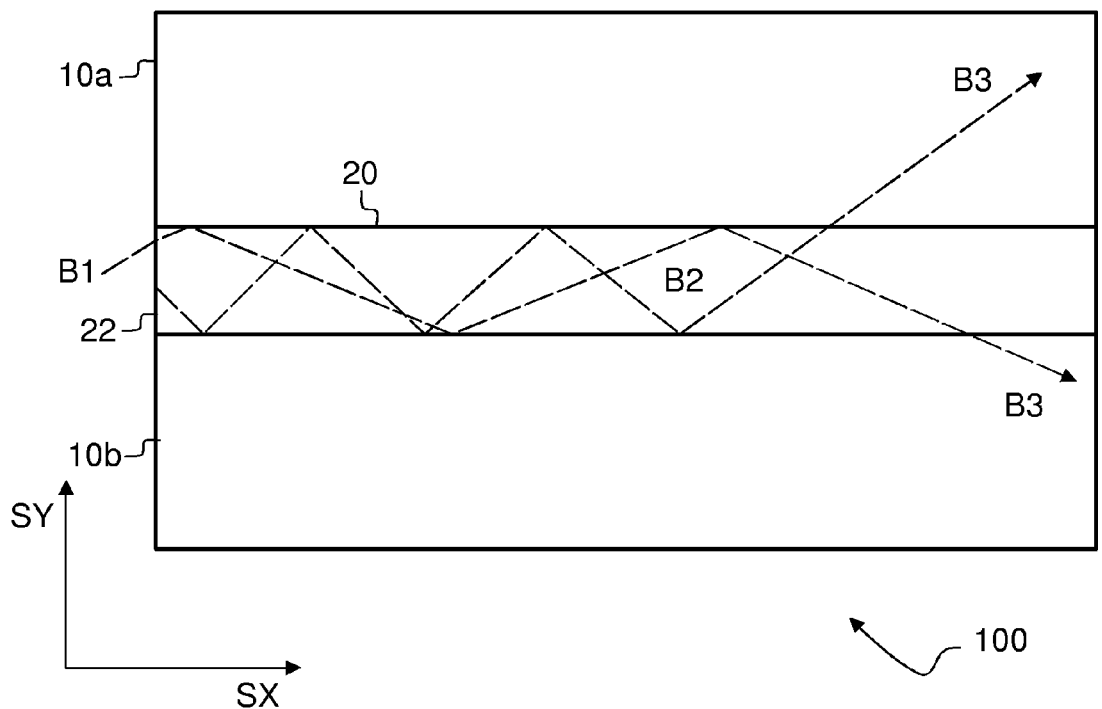
FIG. 5 shows a top view of a device according to FIG. 3.

FIG. 5 shows a top view of the light distributing device 100 according to FIG. 3. The rays of the incoming light beam B1 may be refracted at the end 22 of the ridge 20. In-coupled light rays fulfilling the criterion for total internal reflection constitute the light beam B2 propagating in the ridge 20. A fraction of the light rays is coupled into the planar waveguides 10a, 10b to form the light B3.

Figure 6:
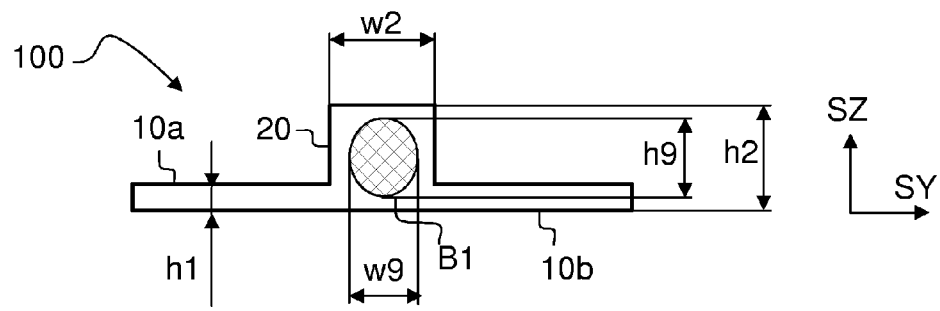
FIG. 6 shows, in an end view, dimensions of an illuminating light beam with respect to the end of the ridge.

FIG. 6 shows the dimensions of the incoming light beam B1 with respect to the dimensions of the ridge 20. The incoming beam B1 has a height h9 and a width w9. The end 22 of the ridge 20 has a height h2 and a width w2. In order to minimize coupling losses, the width w2 may be greater than or equal to the width of the beam B1 and the height h2 may be greater than or equal to the height h9. The thickness h1 of the planar waveguide 10a may be smaller than the height h9 of the incoming beam B1.

w9 and h9 refer to the dimensions of the incoming beam B1 at the end 22 of the ridge 20. The dimensions of the incoming light beam B1 may be defined e.g. by an elliptical perimeter which encloses 70% of the optical output power of a light source 200, and which perimeter encloses the minimum area.

Figure 7A:
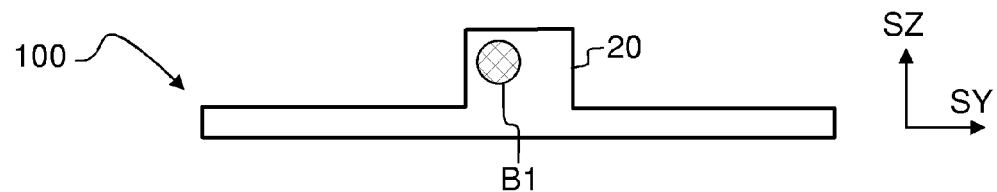
FIG. 7a shows, in an end view, alternative positioning of an illuminating light beam with respect to the end of the ridge.
Figure 7B:
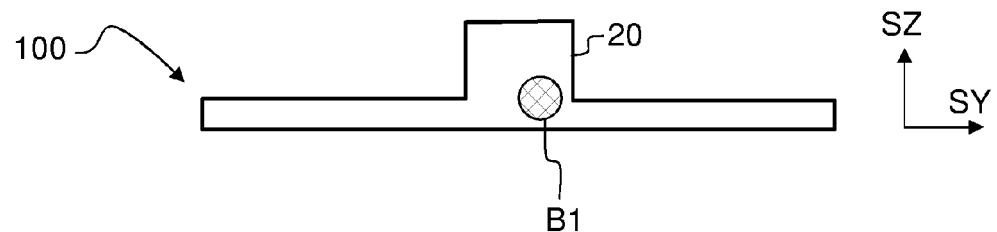
FIG. 7b shows, in an end view, alternative positioning of an illuminating light beam with respect to the end of the ridge.

FIGS. 7a and 7b show how the tolerance to the misalignment of the incoming light beam B1 may be substantially increased, thanks to the ridge 20 of the light distributing device 100, when the width w2 of the ridge is greater than the width of the beam B1 and when the height h2 of the ridge 20 is greater than the height of the beam B1.

Figure 8A:
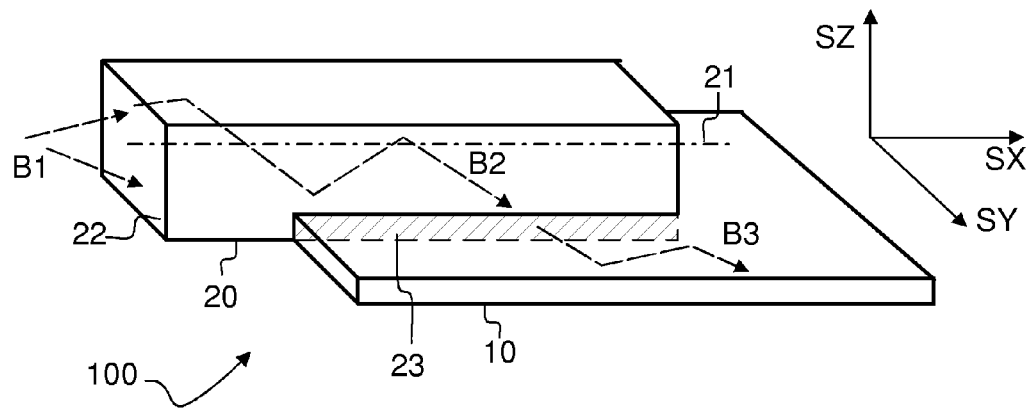
FIG. 8a is a three-dimensional view of light distributing device, wherein a common portion between a ridge and a planar waveguide has been indicated by a hatch pattern.

Referring to FIG. 8a, the light distributing device 100 may comprise a substantially planar waveguide 10 and a ridge 20, wherein said ridge 20 has an end 22 for coupling light B1 into said ridge 20 in order to form a light beam B2 waveguided in said ridge 20 in the longitudinal direction SX of said ridge 20, and wherein said ridge 20 and said planar waveguide 10 have a common portion 23 to couple light of said light beam B2 out of said ridge 20 into said planar waveguide 10 sideways with respect to the longitudinal direction SX of said ridge 20.

The ridge 20 and the planar waveguide 10 overlap at least partially.

The longitudinal direction means the direction of the centerline 21 of the ridge 20. In case of a curved ridge 20 (FIGS. 11 and 25b), the longitudinal direction may locally deviate from the longitudinal direction SX near the end 22 of the ridge 20.

The common portion 23 is defined to be at a location of minimum common interfacial area between the ridge 20 and the planar waveguide 10. The common portion 23 is indicated in FIG. 8a by a hatch pattern.

Figure 8B:
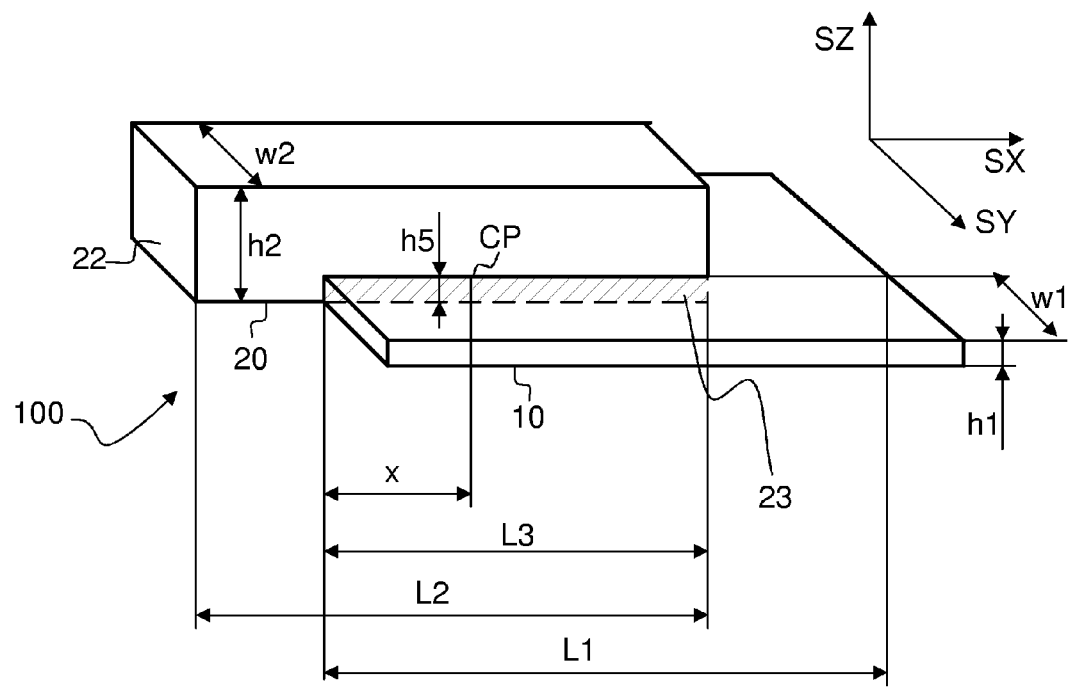
FIG. 8b shows, in a three dimensional view, dimensions of the device according to FIG. 8a, FIG. 8c shows a side view of the device according to FIG. 8a, FIG. 8d shows a top view of the device according to FIG. 8a, FIG. 9a shows the ratio of the optical power remaining in the ridge to the optical power coupled into the ridge, as a function of the distance from the end of the common portion.

FIG. 8b shows a plurality of dimensions associated with the light distributing device 100 according to FIG. 8a. The ridge 20 has a length L2, and the planar waveguide 10 has a length L1. The common portion 23 has a length L3 and a height h5. The length L3 of the common portion 23 may be shorter than or equal to the length L2 of the ridge 20. The length L3 of the common portion 23 may be shorter than or equal to the length L1 of the planar waveguide 10. The height h5 of the common portion may be smaller than, greater than, or equal to the thickness h1 of the planar waveguide 10 (see FIGS. 23a, 23b). The height h5 may be different at different points CP of the common portion 23, i.e. at different distances X from the end of the common portion 23. w1 denotes a width of the planar waveguide 10, as measured from the wall of the ridge 20 to the edge of the planar waveguide 10.

The dimensions of a light distributing device 100 may be e.g. as follows: The height h2 of the ridge 20 may be greater than or equal to two times the thickness h1 of the planar waveguide 10. The width w2 of the ridge 20 may be greater than or equal to two times the thickness h1 of the planar waveguide 10. The width w1 of the planar waveguide 10 may be greater than or equal to ten times the thickness h1 of the planar waveguide 10. The length L3 of the common portion 23 may be greater than or equal to ten times the thickness h1 of the planar waveguide 10.

A significant improvement in the coupling efficiency may be gained even though the height h2 of the ridge 20 is only 1.5 to 2 times the thickness h1 of the planar waveguide 10.

The absolute thickness h1 of the planar waveguide may be e.g. in the range of 0.2 to 0.5 mm. In order to implement light and/or flexible structures, the thickness h1 may be in the range of 0.1 to 0.2 mm. In order to implement very light and/or flexible structures, the thickness h1 may be in the range of 0.05 to 0.1 mm. In order to implement extremely light and/or flexible structures, the thickness h1 may be smaller than 0.05 mm. The lowest limit of the thickness h1 is defined by the requirement to allow at least single mode waveguiding. The smallest thickness h1 may be e.g. 10 μm.

In order to implement e.g. light distributing device 100 to illuminate a keyset and/or display (FIG. 21), the width w1 and/or the length L1 of the planar waveguide may be e.g. in the range of 5 to 100 mm. If the device 100 comprises out-coupling portions 30, the sum of the areas of the out-coupling elements 30 may be e.g. greater than 5% of the one-sided area of the planar waveguide 10.

Figure 8C:
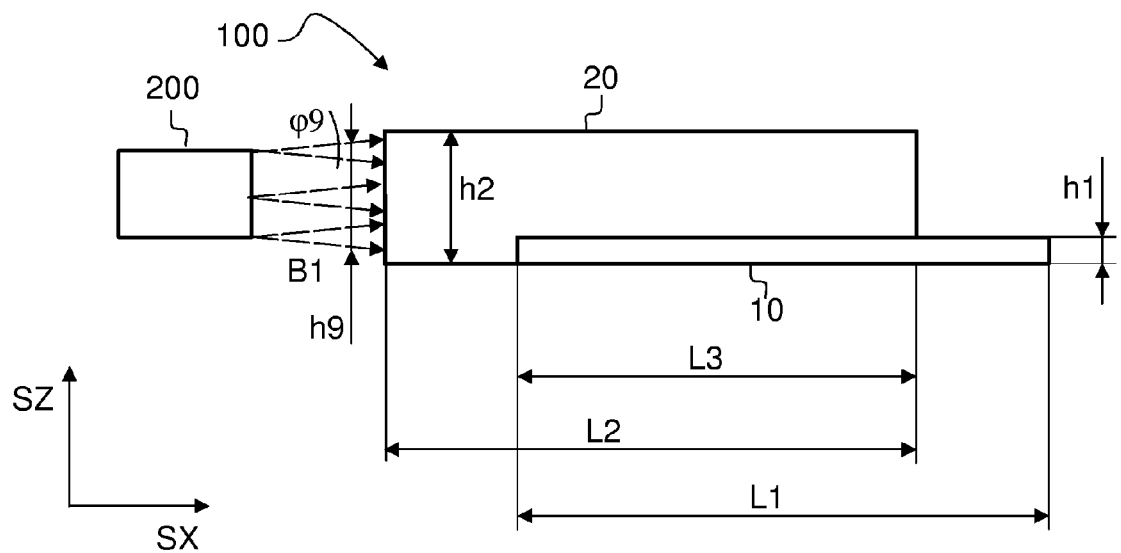
Figure 8D:
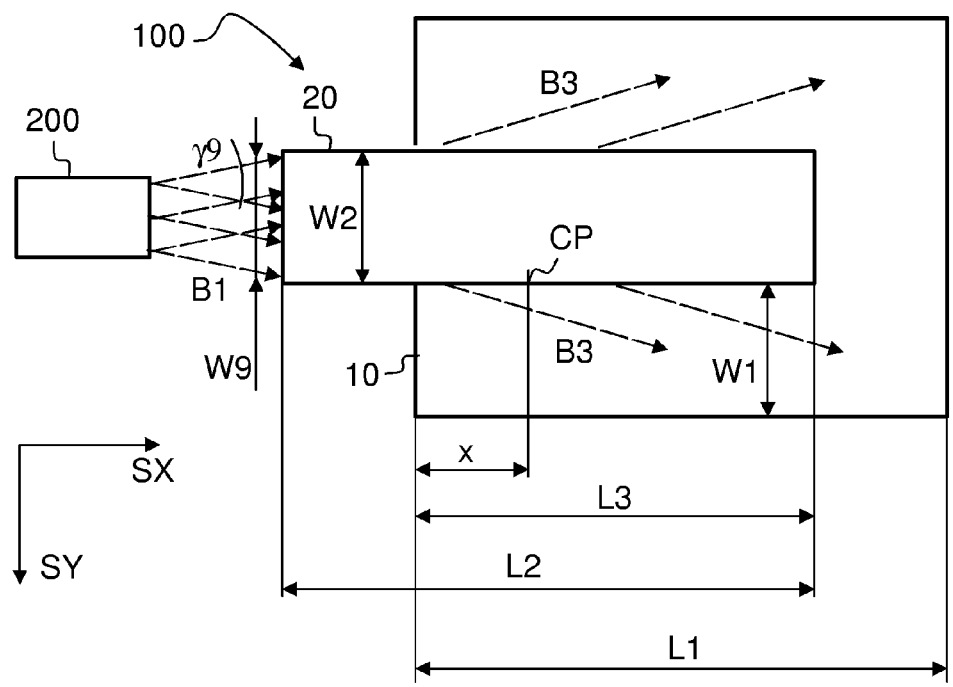

FIG. 8c shows a side view of the light distributing device 100 according to FIG. 8a. FIG. 8d shows a top view of the light distributing device 100 according to FIG. 8a, when coupled to a light source 200.

In order to reduce the coupling losses, the height h9 of the beam B1 emitted by the light source 200 may be smaller than or equal to the height of the ridge 20. The width w9 of the beam B1 may be smaller than or equal to the width of the ridge W2. The vertical divergence φ9 and the horizontal divergence γ9 of the beam B1, the orientation of the beam B1 with respect to the end 22 of the ridge 20, and the index of refraction of the ridge 20 may be selected such that substantially all light coupled into the ridge 20 fulfils the criterion of total internal reflection.

The beam B1 may be substantially collimated in the vertical and/or horizontal directions. Thus, the vertical divergence φ9 and/or the horizontal divergence γ9 may be smaller than 2 degrees. The beam B1 may be diverging in the vertical and/or horizontal directions, i.e. the vertical divergence φ9 and/or the horizontal divergence γ9 may be in the range of 2 to 5 degrees, in the range or 5 to 20 degrees, or even in the range of 20 to 60 degrees. The beam B1 may be highly diverging, and the vertical divergence φ9 and/or the horizontal divergence γ9 may even be in the range of 60 to 180 degrees.

Figure 9A:
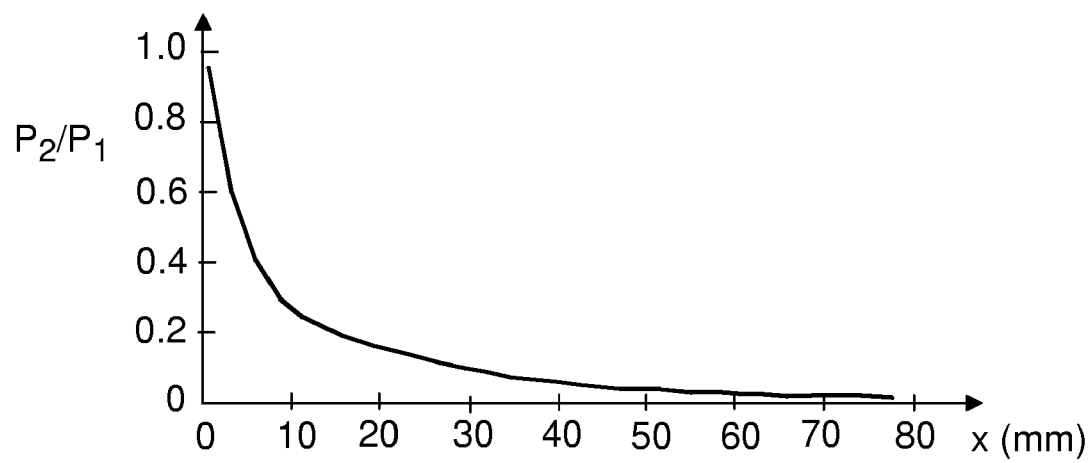
FIG. 9b shows the ratio of the optical power coupled into the planar waveguide to the optical power coupled into the ridge, as a function of the distance from the end of the common portion.

FIG. 9a shows, by way of example, the ratio $P_2/P_1$ of optical power $P_2$ propagating in the ridge 20 to the optical power $P_1$ initially coupled into the end 22 of the ridge 20, as a function of the distance x from the end of the common portion 23. The ratio $P_2/P_1$ decreases with the increasing distance x as more and more light has leaked from the ridge 20 into the planar waveguide 10.

Figure 9B:
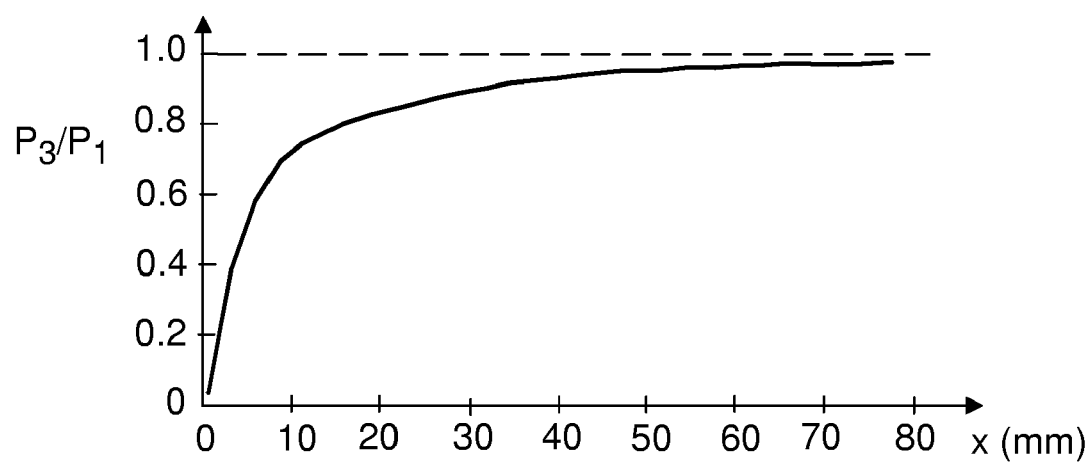

FIG. 9b shows, corresponding to the situation of FIG. 9a, the ratio $P_3/P_1$ of optical power $P_3$ coupled to the planar waveguide 10 to the optical power $P_1$ initially coupled into the end of the ridge 20, as a function of the distance x from the end of the common portion 23. The ratio $P_3/P_1$ increases with the increasing distance x as more and more light has leaked from the ridge 20 into the planar waveguide 10.

The situation of FIGS. 9a and 9b corresponds to the following set of parameters: Straight rectangular ridge 20 having a height of 0.4 mm and a width w2 of 1.0 mm. The ridge 20 has planar waveguides 10a, 10b on both sides of the ridge 20, the thickness of the planar waveguides 10a,10b and the height of the common portion 23 is 0.2 mm. The incoming light is provided by a LED which is located near the end 22 of the ridge 20, The width W9 of the beam B1 is 1 mm and the height h9 of the beam B1 is 0.4 mm. The divergence of the beam B2 propagating in the ridge 20 is 39.2 degrees. The index of refraction of the ridge 20 and the planar waveguides 10a, 10b is 1.58. The medium surrounding the ridge 20 and the planar waveguides 10a, 10b is air having the refractive index of one.

The coupling efficiency near the first end of the common portion 23, i.e. at low values of x may be increased e.g. by maximizing the ratio of the height h5 of the common portion to the height h2 of the ridge 20. On the other hand, a more uniform coupling efficiency at different values of x may be attained when the ratio of the height h5 of the common portion to the height h2 of the ridge 20 is smaller.

The length L3 and the height h5 of the common portion 23 may be selected for example such that at least 20%, at least 50%, or even at least 90% of the optical power propagating in the ridge 20 can be coupled to the planar waveguide 10.

Figure 10A:
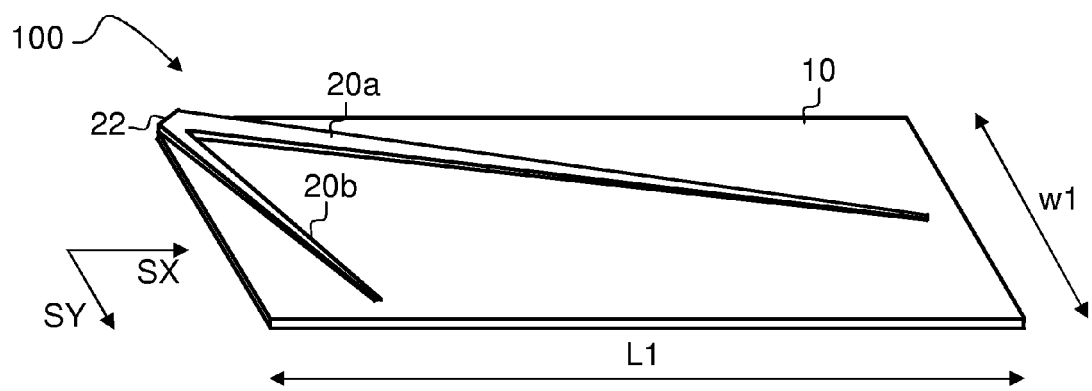
FIG. 10a shows a three dimensional view of a light distributing device comprising a bifurcated tapered ridge waveguide.

FIG. 10a shows a light distributing device 100 comprising a bifurcated tapered ridge having branches 20a, 20b, and a single input end 22. The arrangement of FIG. 10a may be used for coupling light emitted from a single light source 200 into a wide planar waveguide 10 in a substantially uniform manner.

Figure 10B:
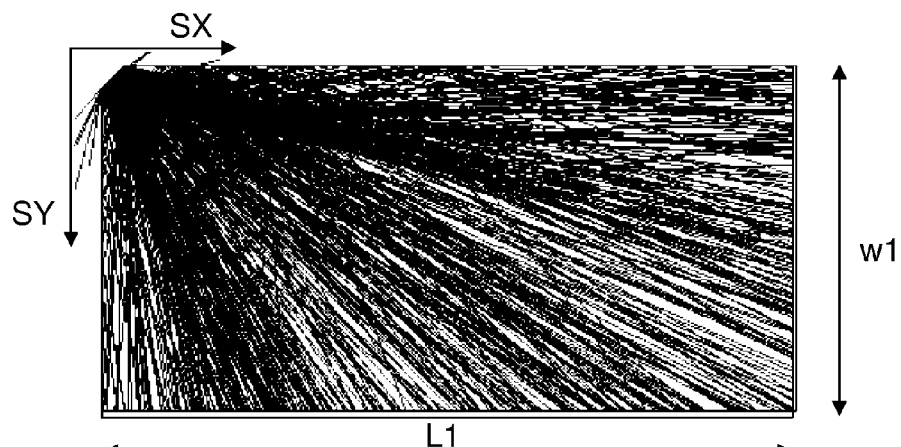
FIG. 10b shows a plot of light rays coupled into the planar waveguide according to FIG. 10a, FIG. 10c is a comparative example showing a plot of light rays coupled into a corner of a planar waveguide plate without using a ridge.

FIG. 10b shows a plot of light rays coupled into the planar waveguide 10 of FIG. 10a. The light input end is at the upper left corner.

Figure 10C:
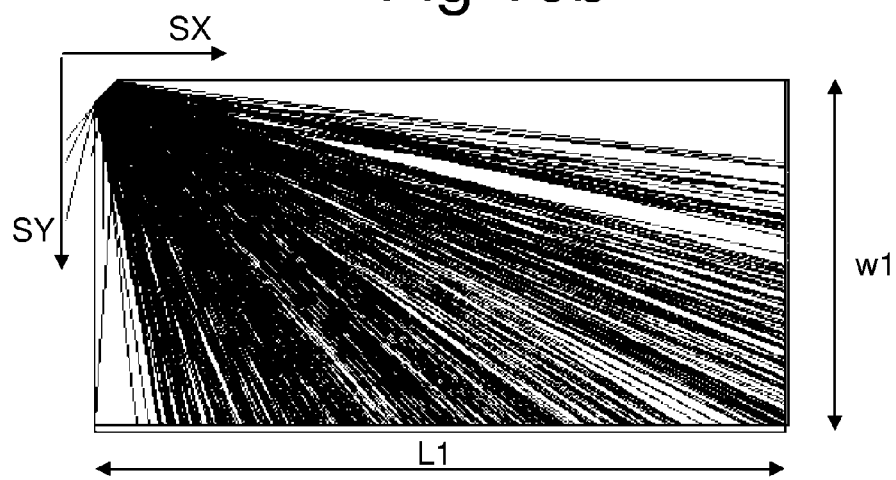

FIG. 10c shows a plot of light rays coupled into the planar waveguide of FIG. 10a, but without using the ridge. It can be noticed that the distribution of light is substantially less uniform than in the case of FIG. 10b.

Figure 11:
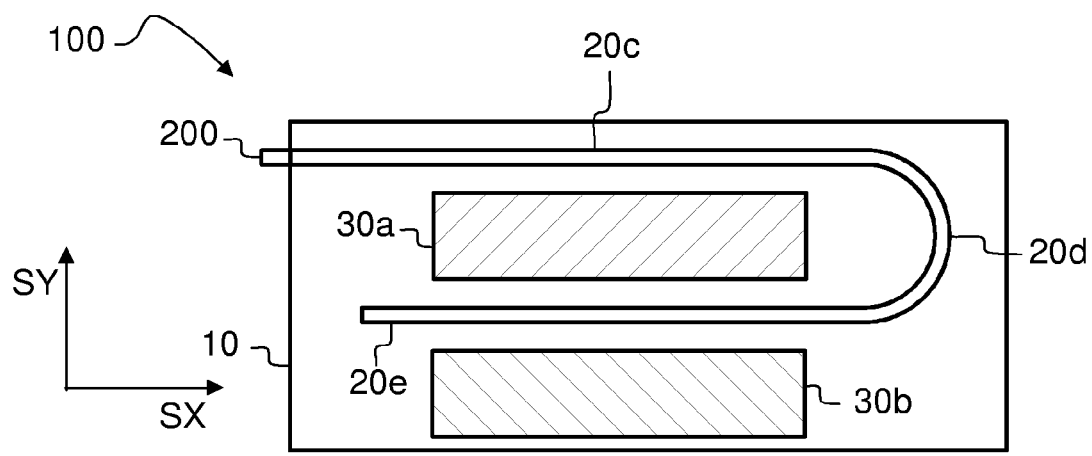
FIG. 11 shows, in a top view, a light distributing device comprising a bent ridge.

FIG. 11 shows a light distributing device 100 which has a bent ridge 20. The ridge 20 may have a curved portion 20d to distribute light into a wide area and/or to enhance coupling of light out of the ridge 20. The curved portion 20d may couple a first portion 20c of the ridge to a second portion 20e of the ridge 20. The curved portion 20c and the second portion 20e of the ridge may be used e.g. to reduce a difference between the intensities provided by a first out-coupling element 30a and a second out-coupling element 30b, especially when the first out-coupling element 30a is located between the first portion 20c of the ridge and the second out-coupling element 30b.

Figure 12:
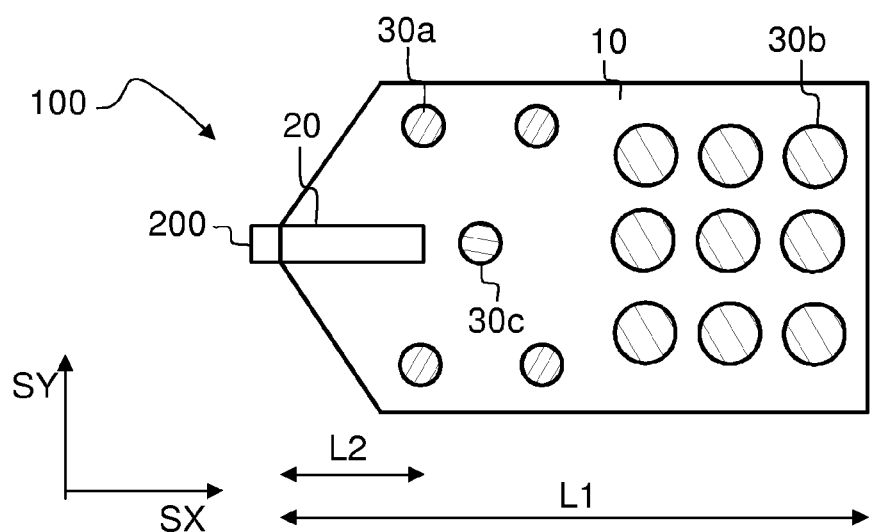
FIG. 12 shows, in a top view, a light distributing device comprising a ridge which is shorter than the planar waveguide.

FIG. 12 shows a light distributing device 100 having a ridge which is shorter than the planar waveguide. The light distributing device 100 may comprise a plurality of out-coupling elements 30a, 30b, 30c.

Figure 13:
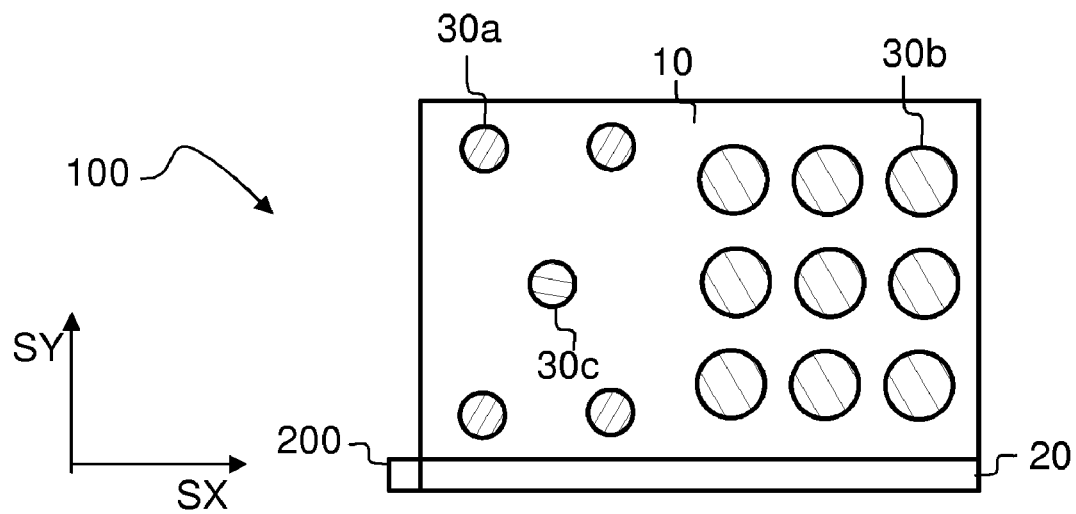
FIG. 13 shows, in a top view, a light distributing device comprising a ridge which is located on the edge of the light distributing device.

FIG. 13 shows that the ridge 20 may also be at the edge of the light distributing device 100.

Figure 14:
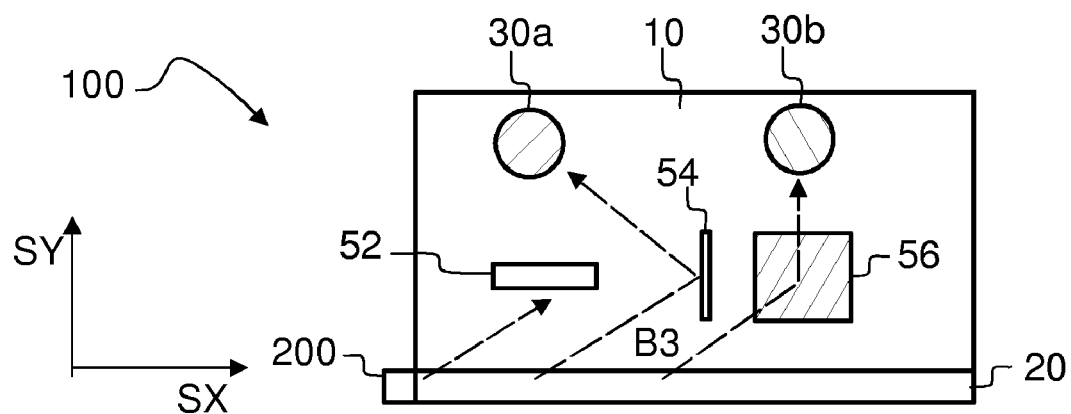
FIG. 14 shows, in a top view, various elements for re-directing light which propagates in the planar waveguide.

FIG. 14 shows various ways to re-direct and/or control light which propagates in the planar waveguide 10. For example, a diffractive grating 56 may be used to change the direction of light. A reflective surface, e.g. an embedded mirror may be used to change the direction of light. An opening 52 may be used block the propagation of light if the opening comprises light absorbing material or if the edges of the opening are cut such that light is diverted away from the plane of the waveguide 10. The opening may also be adapted to act as a reflector, by total internal reflection.

Figure 15:
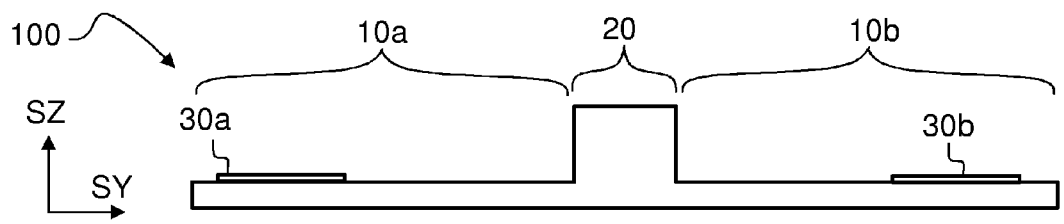
FIG. 15 shows, in an end view, a ridge having a substantially rectangular cross section.

FIG. 15 shows a ridge 20 having a substantially rectangular cross section.

Figure 16:
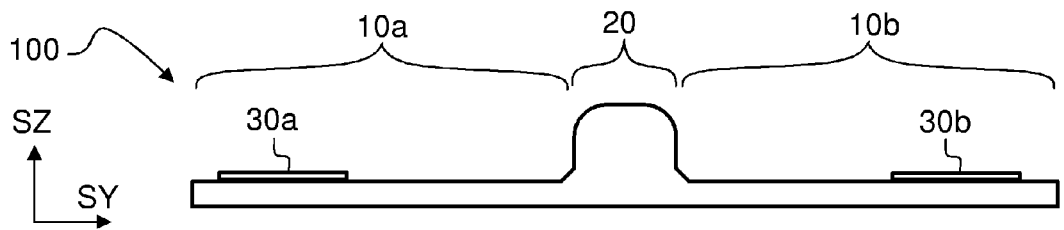
FIG. 16 shows, in an end view, a ridge having a rounded cross section.

FIG. 16 shows a ridge 20 having a substantially rounded cross section.

A ridge 20 having a rectangular cross section may be used e.g. to keep the horizontal divergence $\gamma 9$ and the vertical divergence $\phi 9$ substantially independent. For example, the use of the rectangular ridge 20 may maintain the vertical divergence of the beam B2 below 2 degrees inside the ridge 20, although the horizontal divergence of the beam B2 may simultaneously be as high as 30 degrees. In case of a rounded cross section, a high horizontal divergence typically increases an initially small vertical divergence.

Figure 17:
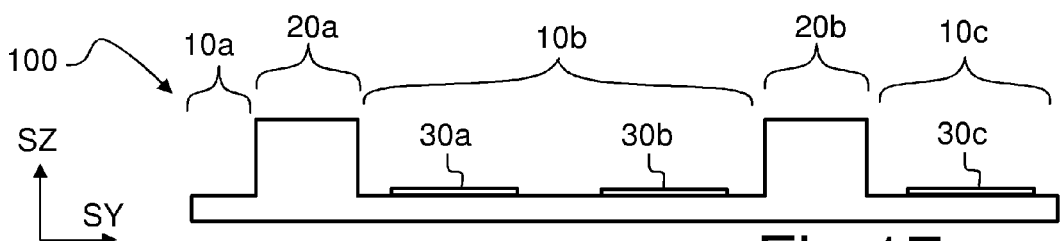
FIG. 17 shows, in an end view, a light distributing device comprising a plurality of ridges.

FIG. 17 shows a light distributing device 100 comprising several ridges 20 and several planar waveguides 10a, 10b, 10c.

Figure 18:
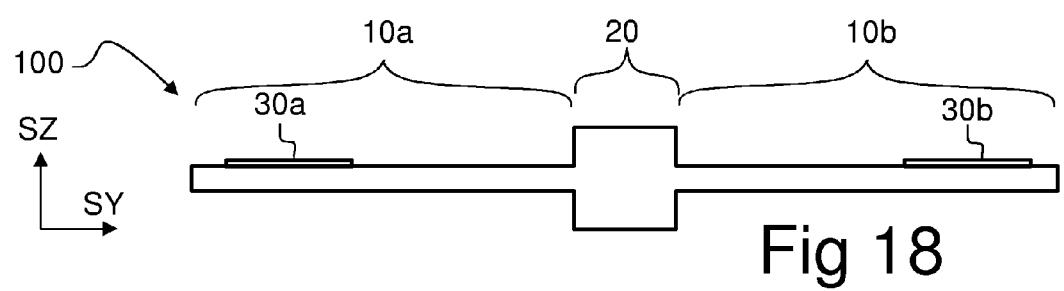
FIG. 18 shows, in an end view, a ridge protruding from the upper and the lower side of the light distributing device.

FIG. 18 shows a light distributing device 100 having a ridge which protrudes from the upper side and the lower side of the device 100.

Figure 19:
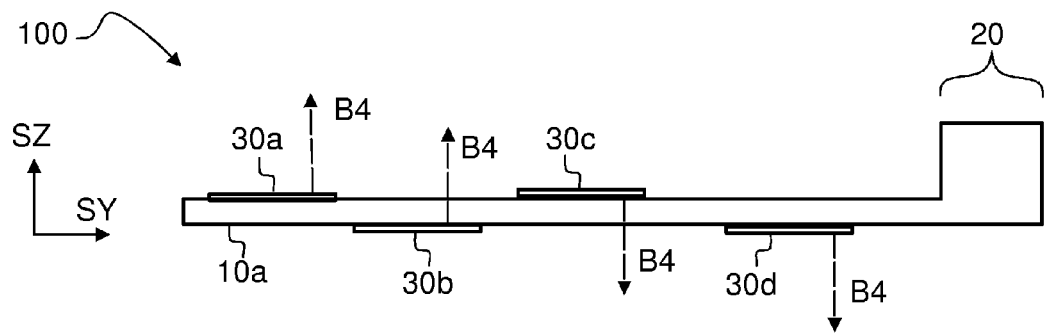
FIG. 19 shows, in an end view, a ridge located on the edge of the light distributing device.

FIG. 19 shows that an out-coupling portion 30b, 30c may direct light out of the plane of the planar waveguide 10 such that an out-coupled light beam B4 is transmitted through the planar waveguide 10. An out-coupling portion 30a, 30d may also direct light out of the plane of the planar waveguide 10 such that an out-coupled light beam B4 is not transmitted through the planar waveguide 10. The out-coupling portions may be on the upper or lower, i.e. on opposite sides of the planar waveguide 10. The out-coupling portions 30a, 30b, 30c, 30d may be arranged such that the beams B4 emitted by them do not overlap, as shown in FIG. 19. The out-coupling portions 30a, 30b, 30c, 30d may also be arranged such that the beams B4 emitted by them overlap partially or completely.

Figure 20:
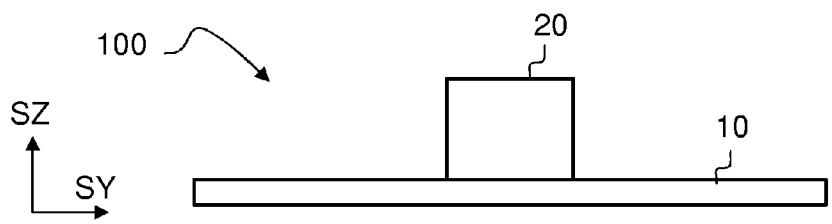
FIG. 20 shows, in an end view, a ridge attached to a planar waveguide.

FIG. 20 shows that the ridge 20 and the planar waveguide 10 may also be initially separate components which are attached together by e.g. glue or welding. The one or more ridges 20 may be positioned on a planar waveguide 10, as shown in FIG. 20. The one or two planar waveguides 10 may also be butt-joined to the side or sides of the ridge 20.

One or more ridges 20 and one or more planar waveguides 10 may also be formed substantially simultaneously by e.g. embossing or molding techniques.

The ridge 20 and the planar waveguide 10 are of substantially transparent material, e.g. polycarbonate or acrylic. The index of refraction and the dimensions of the ridge 20 are selected to allow multimode waveguiding. The planar waveguide may be substantially planar waveguides, in other words, their upper and lower surfaces are substantially parallel and substantially planar. The planar waveguides 10 may be perfectly planar or slightly bent, e.g. cylindrically or spherically bent. The planar waveguides 10 may be of stiff material or of flexible material.

The ridge 20 may be straight. The ridge 20 may also be curved, but losses increase with the decrease of the curvature radius. The radius of curvature may be greater than 100 times the width of the ridge 20 in order to keep the losses at a low level. The ridge 20 may be slightly tapered (FIG. 10a) to increase the divergence of the beam B2 travelling inside the ridge 20 and/or to reduce the amount of transparent material needed to implement the ridge 20.

As the ridge 20 and the planar waveguide are waveguiding, their surfaces should remain substantially smooth, clean and intact. The light distributing device 100 may be used such that it is protected from dirt and contamination. The ridge 20 and/or the waveguide 10 may be partially or completely covered with a protective layer having a lower refractive index than the ridge 20 and the planar waveguide 10.

One or more optical absorbers (not shown) may be attached to the planar waveguide 10 and/or to the ridge 20 in order to prevent unwanted reflections.

The dimensions h1, W1, H2, W2, L1, L2 refer to the dimensions of the waveguiding core of the ridge 20 and the planar waveguide 10, i.e., a possible cladding layer is not taken into consideration.

Figure 21:
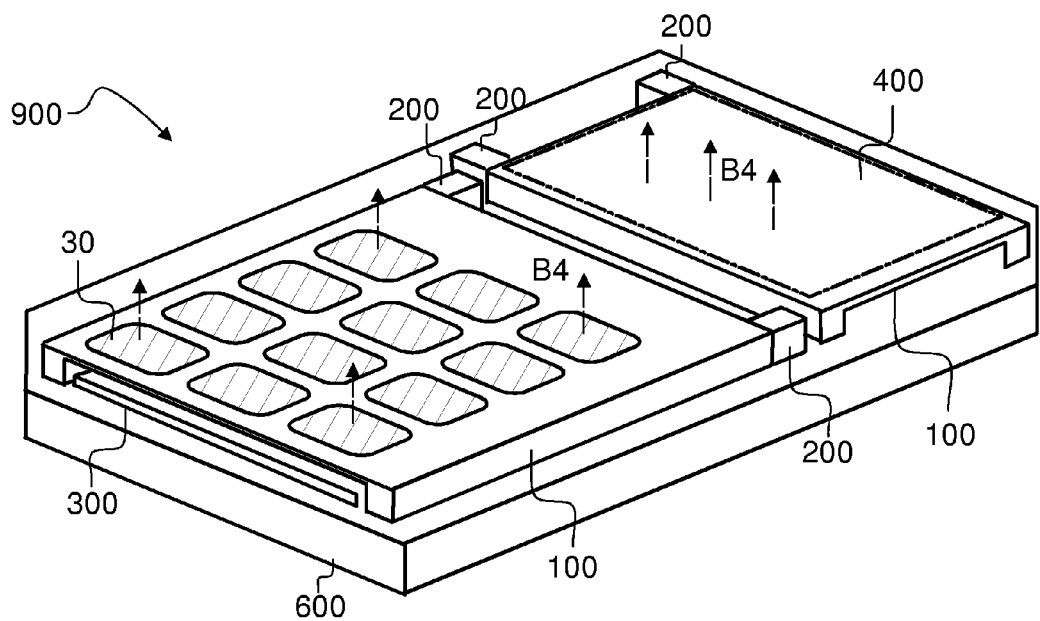
FIG. 21 is a three-dimensional view of a portable device comprising light distributing devices to illuminate a keypad and a display.

FIG. 21 shows a device 900 comprising a keyset 30 and/or a display 400. The keyset 30 may be a keypad or a keyboard. One or more light distributing devices 100 may be used to provide front and/or back lighting to e.g. a liquid crystal (LCD) display 400 or a MEMS display (Micro-Electro-Mechanical System). One or more light distributing devices 100 may be used to provide lighting to a keyset 30. Touch-sensitive elements or switches 300 may be positioned under the back side of light distributing device 100, as shown in FIG. 21, if the device 100 is at least partially flexible. A set of proximity sensors 300 may be positioned under the light distributing device 100. Alternatively, at least partially transparent touch-sensitive elements, switches and or proximity sensors may be positioned on the top of the light distributing device 100 (not shown in FIG. 21).

The ridges 20 may also allow positioning of the relatively thick light sources 200 to such that the outer dimensions of the device 900 may be optimized and/or minimized. The ridges 20 may be positioned with respect to the other components of the device 900 such that the outer dimensions of the device 900 may be optimized and/or minimized.

The device 900 may further comprise a battery, data processing and/or telecommunications module 600. The device 900 may be portable. The device 900 may comprise telecommunications capabilities. The device 900 may be e.g. a mobile phone, and/or a computer.

Yet, the device 900 may be a personal digital assistant (PDA), a communicator, a navigation instrument, a digital camera, a video recording/playback device, an electronic wallet, an electronic ticket, an audio recording/playback device, a game device, a measuring instrument, and/or a controller for a machine.

Figure 22A:
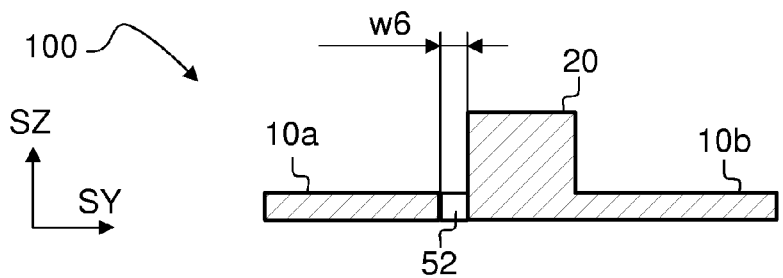
FIG. 22a shows an end view of a light distributing device comprising an opening to locally prevent coupling of light from the ridge into the planar waveguide.
Figure 22B:
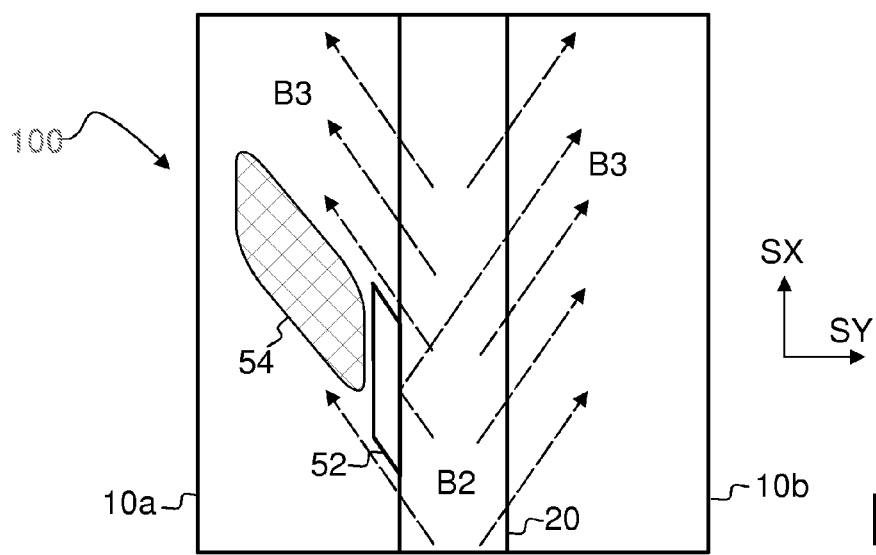
FIG. 22b shows top view of a light distributing device according to FIG. 22a, FIG. 23a shows, in an end view, depressions to locally reduce coupling of light from the ridge into the planar waveguide.

Referring to FIGS. 22a and 22b, the light distributing device 100 may comprise one or more openings 52 to locally prevent coupling of light from the ridge 22 to a portion 54 of the planar waveguide 10a. The ridge side wall of the opening 52 may be located to the side of the ridge and arranged to reflect light back into the ridge 20 by total internal reflection. The width w6 of the opening 52 may be greater than the wavelength of the light, e.g. greater than or equal to 1 μm. To facilitate manufacturing, the width w6 of the opening 52 may be greater than or equal to the thickness h1 of the planar waveguide 10a. The opening 52 may be implemented e.g. by die-cutting.

Figure 23A:
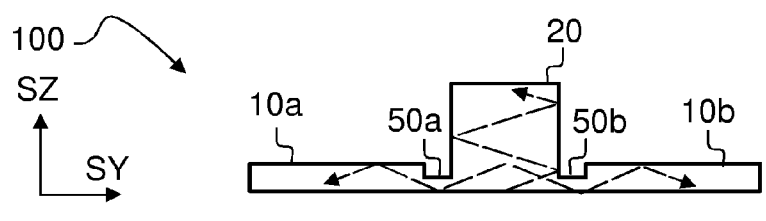
FIG. 23b shows, in an end view, a plurality of dimensions associated with FIG. 23a, FIG. 24 shows, in a top view, the directions between light rays and the longitudinal direction of the ridge.
Figure 23B:
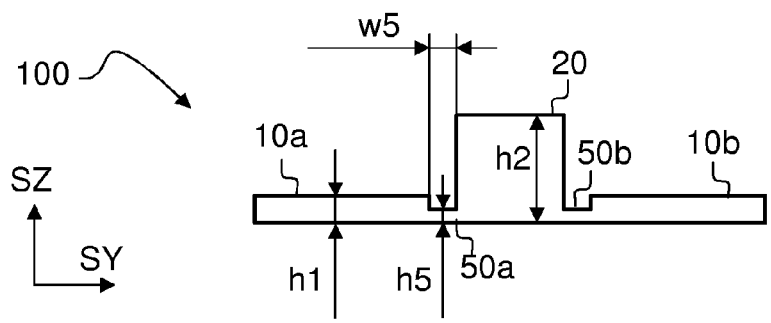

Referring to FIGS. 23a and 23b, the light distributing device 100 may comprise one or more depressions 50a, 50b to locally reduce coupling of light from the ridge to the planar waveguide 10a, 10b. To the first approximation, the optical power coupled through the depression 50a, 50b per unit length of the ridge 20 is proportional to the height h5 of the depression 50a, 50b. The height h5 may be selected to be different at different distances x from the end of the common portion 23 (FIG. 8b). The height h5 may be smaller than or equal to the thickness h1 of the planar waveguide 10a. The height h5 may be e.g. greater than or equal to 0.1 times the thickness h1 of the planar waveguide 10a. The width w5 of the depression 50a, 50b may be greater than the wavelength of the light, e.g. greater than or equal to 1 μm. To facilitate manufacturing, the width w6 of the depression 50a, 50b may be greater than or equal to the thickness h1 of the planar waveguide 10a.

Figure 24:
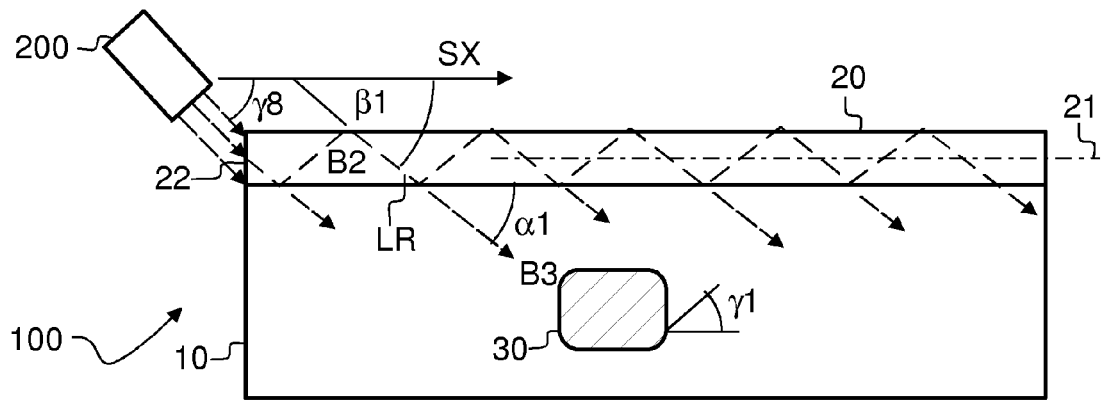

Referring to FIG. 24, the direction of the incoming light beam B1 may be at a non-zero horizontal angle γ8 with respect to the longitudinal direction SX of the ridge 20 such that also the majority of the light rays propagate at an non-zero angle β1 with respect to the longitudinal direction inside the ridge 20, i.e. with respect to the centerline 21 of the ridge 20. The light rays coupled from the ridge 20 to the planar waveguide 10 may be considered to constitute at least locally a light beam B3. The light beam B3 has a non-zero angle α1 with respect to the longitudinal direction.

The light distributing device 100 may comprise one or more diffractive out-coupling portions 30. An out-coupling portion 30 may have diffractive features which are at an angle γ1 with respect to the longitudinal direction SX. The angle β1 and/or the angle γ1 may be selected to optimize the direction and/or the intensity of an out-coupled beam B4 diffracted by the portion 30 (FIG. 3). For example, the angle β1 and/or the angle γ1 may be selected to substantially maximize the intensity of the beam B4.

The local coupling efficiency near the first end of the common portion 23 may be maximized by maximizing the angle γ8 of the incoming beam B1 such that at least 70% of the light coupled through the end 22 of the ridge 20 fulfills the criterion for total internal reflection. The local coupling efficiency is herein defined to be the ratio of coupled optical intensity in the planar waveguide to the intensity in the ridge, at a distance x from the end of the common portion 23.

On the other hand, a more uniform intensity distribution in the planar waveguide 10 may be attained by selecting a small angle γ8 of the incoming beam B1.

In order to facilitate coupling between the ridge 20 and the waveguide 10, the angle γ8 between the average direction of the beam B1 and the longitudinal direction SX may be greater than three times arctan(w2/L3) and/or greater than three times arctan (h2/L3).

In order to facilitate coupling between the ridge 20 and the waveguide 10, the horizontal divergence γ9 of the beam B1 may be greater than three times arctan(w2/L3) and/or vertical divergence φ9 of the beam B1 may be greater than three times arctan (h2/L3).

In order to facilitate coupling between the ridge 20 and the waveguide 10, the angle β1 between the average direction of the beam B2 and the longitudinal direction may be greater than three times arctan(w2/L3) and/or greater than three times arctan (h2/L3).

In order to facilitate coupling between the ridge 20 and the waveguide 10, the horizontal divergence of the beam B2 propagating in the ridge 20 may be greater than three times arctan(w2/L3) and/or the vertical divergence of the beam B2 propagating in the ridge 20 may be greater than three times arctan (h2/L3).

The end 22 of the ridge 20 may be substantially perpendicular to the longitudinal direction SX. Alternatively, the end 22 may be substantially inclined with respect to longitudinal direction SX in order to change the direction of the beam B2 in the ridge 20. The end 22 may be substantially planar. Alternatively, the end 22 may have a convex or a concave form to affect the divergence of the beam B2 coupled into the ridge 20.

Figure 25A:
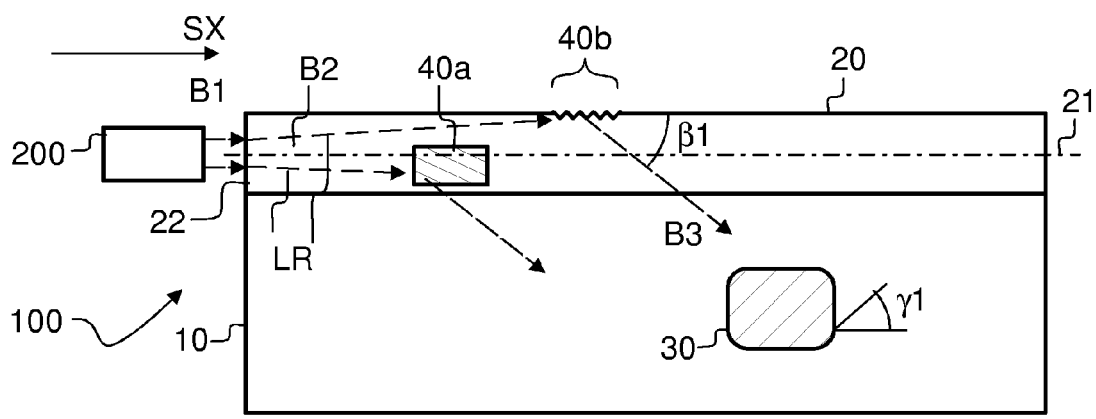
FIG. 25a shows, in a top view, a light distributing device comprising light redistributing features on the ridge.

FIG. 25a shows light redistributing features 40a, 40b adapted to enhance coupling of light from the ridge 20 into the planar waveguide 10. One or more light redistributing features 40a, 40b may be implemented on the walls of the ridge 20. The light redistributing features 40a, 40b may be e.g. diffraction gratings and/or prisms adapted to direct the light of the beam B2 towards the common portion 23.

In general, the light distributing features 40a, 40b may be adapted to increase the angle β1 or angles between the light rays LR of the beam B2 and the centerline 21 of the ridge 20. The increase of said angle β1 enhances coupling of light from the ridge 20 into the planar waveguide 10.

Also the walls of the ridge 20 may be inclined such that coupling of light from the ridge 20 to the planar waveguide 10 is enhanced.

Light may be coupled from the ridge 20 to the waveguide 10 if the incoming beam has a substantial divergence φ9, γ9, if the angle β1 is substantially different from zero, and/or if the ridge 20 comprises light redistributing features 40a, 40b.

Figure 25B:
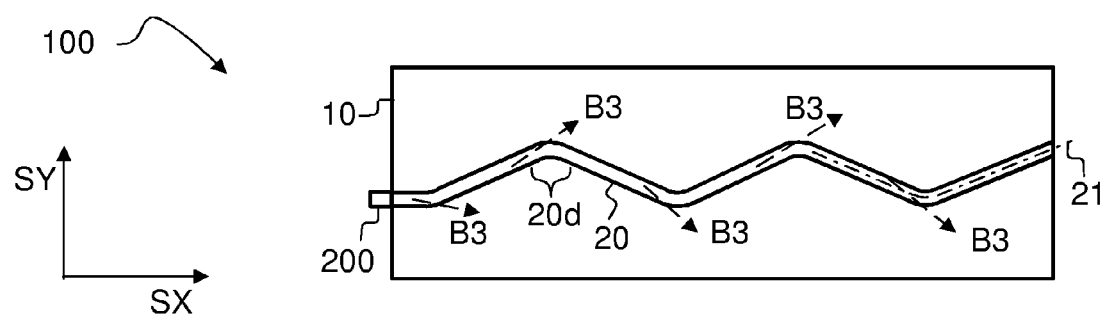
FIG. 25b shows, in a top view, a light distributing device comprising a curved ridge.

The light redistributing feature 40a or 40b may also be a curved portion of the ridge 20. Referring to FIG. 25b, the ridge 20 may comprise one or more curved portions 20d to increase an angle between light rays LR waveguided inside the ridge 20 and the centerline 21 of the ridge 20. Thus, the curved portion 20d enhances coupling of light out of the ridge 20 into the planar waveguide 10. The centerline 21 is drawn only partially in FIG. 25b to preserve the clarity of the FIG. 25b.

Figure 25C:
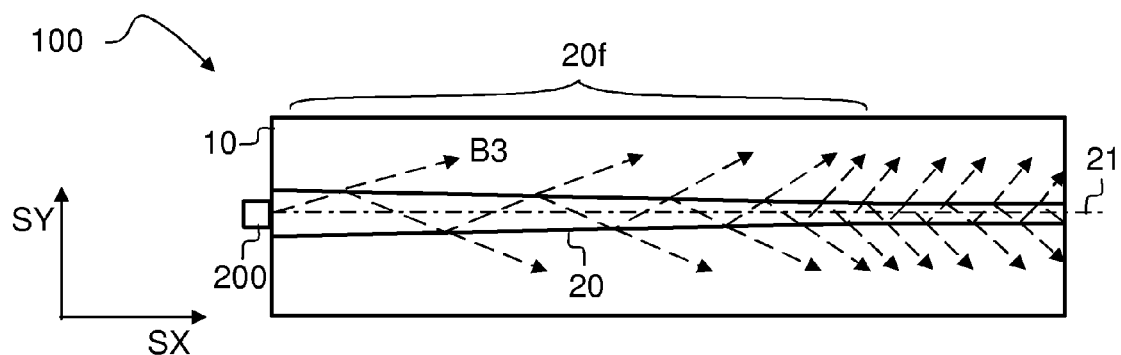
FIG. 25c shows, in a top view, a light distributing device comprising a tapered ridge.

The light redistributing feature 40a or 40b may also be a tapered portion of the ridge 20. Referring to FIG. 25c, the ridge 20 may have a tapered portion 20f to increase an angle between light rays waveguided inside the ridge 20 and the centerline 21 of the ridge 20. Thus, the tapered portion 20f enhances coupling of light out of the ridge 20 into the planar waveguide 10. In particular, the tapered portion 20f may increase the divergence of the beam B2 propagating in the ridge 20. The tapered portion 20f may be vertically, horizontally and/or conically tapered. The whole ridge 20 may be tapered.

Figure 26:
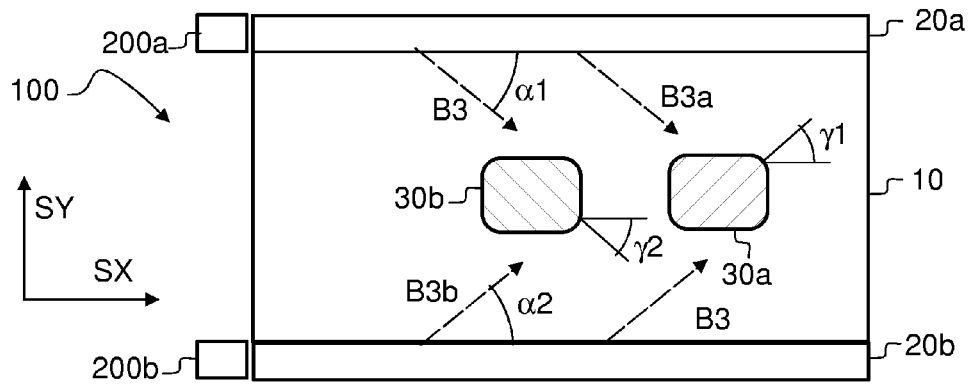
FIG. 26 shows, in a top view, a light distributing device comprising two ridges to provide different propagation directions of light inside the planar waveguide.

Referring to FIG. 26, the light distributing device 100 may comprise a first ridge 20a to provide a first beam B3a propagating in the planar waveguide, and a second ridge 20b to provide a second beam B3b propagating in the planar waveguide such that the first and the second beams have different directions a1, a2 with respect to the longitudinal direction SX of the first ridge 20a. The light distributing device 100 may comprise two or more separately controlled light sources 200a, 200b. Light provided by a first light source 200a, may be coupled to the first ridge 20a, and light provided by a second light source 200b, may be coupled to the second ridge 20b.

The light distributing device 100 may further comprise at least two diffractive out-coupling portions 30a, 30b. The direction of the diffractive features of a first portion 30a may be defined by an angle $\gamma 1l$ and the direction of the diffractive features of a second portion 30b may be defined by an angle $\gamma 2$.

The angles $\alpha 1$, $\alpha 2$, $\gamma 1$, $\gamma 2$ may be selected such that light provided by the first light source 200a and coupled out by the first out-coupling portion 30a has substantially greater intensity than light provided by the first light source 200a and coupled out by the second out-coupling portion 30b. Respectively, light provided by the second light source 200b and coupled out by the second out-coupling portion 30b may have substantially greater intensity than light provided by the second light source 200b and coupled out by the first out-coupling portion 30a.

Figure 27:
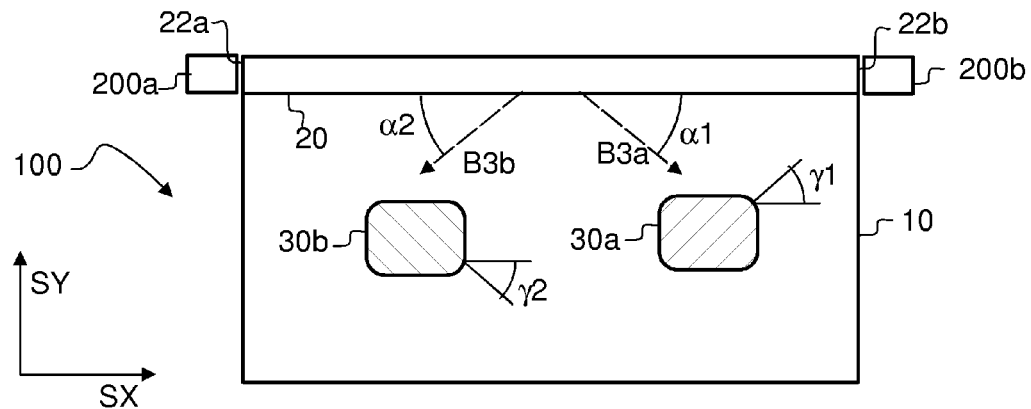
FIG. 27 shows, in a top view, coupling of light into the opposite ends of the ridge in order to provide different propagation directions of light inside the planar waveguide.

Referring to FIG. 27, a first light source 200a may be coupled to a first end 22a of a ridge 20, and a second light source 200b may be coupled to a second end 22b of a ridge 20 such that a first beam B3a provided by the first light source 200a propagates in a first directional and a second beam B3b provided by a second light source 200b propagates in a second direction $\alpha 2$.

The light distributing device 100 may further comprise at least two diffractive out-coupling portions 30a, 30b. The direction of the diffractive features of a first portion 30a may be defined by an angle $\gamma 1$ and the direction of the diffractive features of a second portion 30b may be defined by an angle $\gamma 2$.

The angles $\alpha 1$, $\alpha 2$, $\gamma 1$, $\gamma 2$ may be selected such that light provided by the first light source 200a and coupled out by the first out-coupling portion 30a has substantially greater intensity than light provided by the first light source 200a and coupled out by the second out-coupling portion 30b. Respectively, light provided by the second light source 200b and coupled out by the second out-coupling portion 30b may have substantially greater intensity than light provided by the second light source 200b and coupled out by the first out-coupling portion 30a.

The first 30a and the second out-coupling portion 30b may be adjacent to or near each other. The first 30a and the second out-coupling portion 30b may be divided into sub-portions, and the sub-portions of the first out-coupling portion 30a may be interlaced with the sub-portions of the second out-coupling portion 30b. The sub-portions may be e.g. pixels or stripes which together constitute a pattern or a character. The first 30a and the second out-coupling portion 30b may also be partially or completely overlapping.

Thus, for example, the device 900 of FIG. 21 may have at least two modes of operation. In a first mode light is coupled out by a first group of out-coupling portions 30a associated with a first visual appearance of the keyset (300), and in a second mode light is coupled out by a second group of out-coupling portions 30b associated with a second visual appearance of the keyset (300). The different visual appearances may e.g. correspond to a vertical and a horizontal orientation of a handheld device 900 with respect to a viewer.

The light distributing device 100 may be optimized to operate at a predetermined wavelength $\lambda$ selected from the range of visible wavelengths 400-760 nm. The light distributing device 100 may be optimized to operate at the whole range of visible wavelengths 400-760 nm.

The substantially planar surface of the planar waveguide 10, 10a, 10b may have one or more out-coupling portions 30, 30a, 30b.

The out-coupling portion 30 and/or light redistributing features 40a, 40b may be e.g. a diffractive grating, prism or mirror embossed, molded or attached on, or embedded in the planar waveguide 10, 10a, 10b or in the ridge 20. The out-coupling element 30 may also be a rough portion of the surface. The out-coupling element 30 may also be a substantially transparent object which is in contact with surface of the planar waveguide 10 causing local frustration of total internal reflection.

The diffraction gratings of out-coupling portions 30 and/or light redistributing features 40a, 40b may have a grating constant selected e.g. from the range of 0.4-4 µm.

Figure 28:
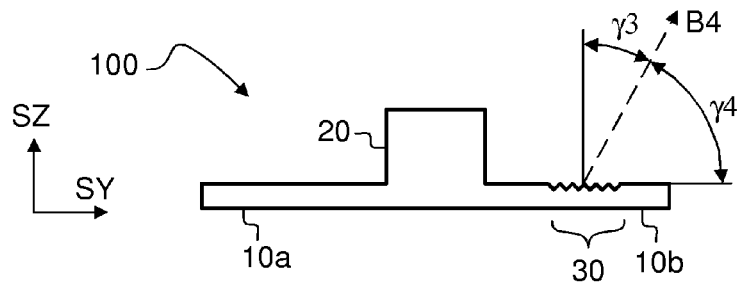
FIG. 28 shows, in an end view, the direction of a beam provided by an out-coupling element.

Referring to FIG. 28, the planar waveguide 10 of the light-distributing device 100 may comprise one or more out-coupling elements 30 to couple light out of the plane of the planar waveguide 10. An angle $\gamma 3$ between average direction of the out-coupled beam B4 and the vertical direction SZ, may be in the range of 0 to 70 degrees, in particular in the range of 0 to 40 degrees. Respectively, an angle $\gamma 4$ between the average direction of a beam B4 and the plane of the planar waveguide 10 may be in the range of 20 to 90 degrees, in particular in the range of 50 to 90 degrees.

The light distributing device 100 may also be used e.g. to distribute light into a plurality of further waveguides, devices or optical components, which may be positioned near or in contact with the edges of the planar waveguide 10, in contact with the surface of the planar waveguide 10, and/or near the out-coupling elements 30.

The light distributing device 100 may also be used to provide light-emitting signs. The signs may be e.g. extremely lightweight "fasten seatbelt" signs for airplanes, or luminous highway traffic signs. In other words, a light-emitting sign may comprise a light distributing device 100, wherein the visual appearance of a light emitting portion or portions may be defined by the perimeter of one or more out-coupling elements 30, or by a mask superposed over one or more out-coupling elements 30. The signs may have two or more light-emitting modes and different visual appearances, as described above with reference to FIGS. 26 and 27.

For the person skilled in the art, it will be clear that modifications and variations of the devices and method according to the present invention are perceivable. All drawings are schematic. The particular embodiments described above with reference to the accompanying drawings are illustrative only and not meant to limit the scope of the invention, which is defined by the appended claims.

The invention claimed is:
1. A device comprising:
a ridge, a substantially planar waveguide having a first surface and a second surface and comprising a plurality of out coupling portions on one of or on both of the first or second surfaces of the substantially planar waveguide, wherein said ridge has an end for coupling light into said ridge in order to form a light beam waveguided longitudinally within said ridge, said ridge and said substantially planar waveguide having a common portion to couple light out of said ridge sideways into said substantially planar waveguide, and said out-coupling portion being adapted to couple light out of the substantially planar waveguide, the light having substantially non-uniform intensity distribution on the first and second surfaces; and at least one of:

a set of proximity sensors positioned under the substantially planar waveguide opposite the planar surface, and at least partially transparent touch sensitive elements positioned over the substantially planar waveguide adjacent to the planar surface for providing in the device a keypad or a keyboard.

2. The device according to claim 1, wherein at least one of said out-coupling portions comprises a diffraction grating.

3. The device according to claim 1, wherein said ridge comprises one or more light redistributing features implemented on a wall of the ridge to enhance coupling of the light from the ridge to the substantially planar waveguide.

4. The device according to claim 3, wherein each of the one or more light redistributing features is implemented as a diffraction grating or a prism.

5. The device according to claim 1 further comprising a light source, wherein the end of said ridge is arranged to couple light emitted from said light source into said ridge so as to form the light beam waveguided longitudinally within said ridge.

6. The device according to claim 5 further comprising a keyset, wherein said at least out-coupling element is adapted to direct light out of the plane of said planar waveguide in order to form at least one light beam associated with features of said keyset.

7. The device according to claim 5 further comprising a display, wherein said at least out-coupling element is adapted to direct light out of the plane of said planar waveguide in order to form at least one light beam adapted to provide light to said display.

8. The device according to claim 1, in which the ridge comprises a first ridge and the common portion comprises a first common portion; the device further comprising:

a second ridge having a second common portion to couple light out of said second ridge sideways into said substantially planar waveguide;

in which the first and second common portions are disposed along opposed sides of the substantially planar waveguide.

9. The device according to claim 1, in which the device comprises the at least partially transparent touch sensitive elements.

10. The device of claim 1, wherein at least two of the plurality of out coupling portions comprise diffraction gratings having a different direction of diffraction features.

11. The device of claim 1, wherein at least one of the plurality of out coupling portions is transmitted through the substantially planar waveguide.

12. The device of claim 1, wherein the light out of the substantially planar waveguide have an average direction at an angle with a perpendicular to the substantially planar waveguide between zero and seventy degrees.

13. A device comprising: a ridge having two or more bifurcated branches; and a substantially planar waveguide comprising at least one out-coupling portion, wherein said ridge has an end for coupling light into said ridge in order to form a light beam waveguided longitudinally within said ridge and the bifurcated branches, said ridge and said planar waveguide having a common portion to couple light out of said ridge and the bifurcated branches sideways into said planar waveguide, and said out-coupling portion being adapted to couple light out of the plane of said planar waveguide.

14. A device comprising a light distributing means, said light distributing means comprising:

a first waveguiding means having a first surface and a second surface and comprising a plurality of light out-coupling means on one of or on both of the first or second surfaces of the first waveguiding means, and a second waveguiding means, wherein the second waveguiding means is thicker than said first waveguiding means, said second waveguiding means having a light receiving means to couple light into said second waveguiding means to form a light beam waveguided longitudinally in said second waveguiding means, said first waveguiding means and said second waveguiding means having a common portion to couple light out of said second waveguiding means sideways into said first waveguiding means, and said out-coupling means being adapted to couple light out of the first waveguiding means, the light having substantially non-uniform intensity distribution on the first and second surfaces;

the device further comprising at least one of a set of proximity sensors positioned under the first waveguiding means opposite the planar surface, and at least partially transparent touch sensitive elements positioned over the first waveguiding means adjacent to the planar surface for providing in the device a keypad or a keyboard.

15. The device according to claim 14 further comprising a light source, wherein said light receiving means is arranged to couple light emitted from said light source into said second waveguiding means.

16. The device according to claim 14, in which the second waveguiding means comprises a first and a second ridge disposed along opposed sides of the first waveguiding means.

17. The device according to claim 14, in which the device comprises the at least partially transparent touch sensitive elements.

18. The device of claim 14, wherein at least two of the plurality of out-coupling means comprise diffraction gratings having a different direction of diffraction features.

19. The device of claim 14, wherein at least one of the plurality of out-coupling means is transmitted through the first waveguiding means.

20. The device of claim 14, wherein the light out of the first waveguiding means have an average direction at an angle with a perpendicular to the first waveguiding means between zero and seventy degrees.

* * * * *